United States Patent [19]
Arnold

[11] 3,874,706
[45] Apr. 1, 1975

[54] FLUID ACTUATED PIPE CONNECTION

[75] Inventor: James Flinnoy Arnold, Houston, Tex.

[73] Assignee: Hydrotech International, Inc., Houston, Tex.

[22] Filed: Sept. 28, 1972

[21] Appl. No.: 290,953

Related U.S. Application Data

[63] Continuation-in-part of Ser. No. 189,686, Oct. 15, 1971, abandoned.

[52] U.S. Cl............... 285/24, 285/96, 285/105, 285/184, 285/261, 285/315, 285/DIG. 21
[51] Int. Cl............................................. F16l 35/00
[58] Field of Search........... 285/18, 96, 24, 27, 105, 285/184, 328, 308, 315, 316, 261, 321, 141; 166/0.6

[56] References Cited
UNITED STATES PATENTS

| | | | |
|---|---|---|---|
| 2,025,113 | 12/1935 | Laurent | 285/261 |
| 2,199,588 | 5/1940 | Cobham et al. | 285/DIG. 21 |
| 2,263,850 | 11/1941 | Nielsen | 285/170 |
| 2,772,226 | 11/1956 | Doll | 285/27 |
| 2,784,987 | 3/1957 | Corcoran | 285/87 |
| 2,962,096 | 11/1960 | Knox | 285/DIG. 21 |
| 3,032,125 | 5/1962 | Hiser et al. | 285/DIG. 21 |
| 3,096,999 | 7/1963 | Ahlstone et al. | 285/24 |
| 3,321,217 | 5/1967 | Ahlstone | 285/315 |
| 3,325,195 | 6/1967 | Margis | 285/328 X |
| 3,333,870 | 8/1967 | Watkins | 285/18 |
| 3,450,421 | 6/1969 | Harwell | 285/24 |
| 3,455,578 | 7/1969 | Hanes | 285/18 |
| 3,486,772 | 12/1969 | Elsner | 285/96 |
| 3,586,350 | 6/1971 | Ashton | 285/24 |
| 3,638,973 | 1/1972 | Poletti | 285/184 |
| 3,695,633 | 10/1972 | Hanes | 285/315 |

Primary Examiner—Dave W. Arola

[57] ABSTRACT

A hydraulic pipe connection having a plurality of individual fluid pressure actuated cam members for camming and locking the enlarged portion or ball on one coupling member in the socket or housing on the other coupling and a seal for sealing between the ball or enlarged portion and the socket or housing in the assembled condition. The fluid pressure force for actuating the cam or locking members is from an external source, thus permitting setting of the coupling in a difficult working environment, such as a subsea location.

4 Claims, 13 Drawing Figures

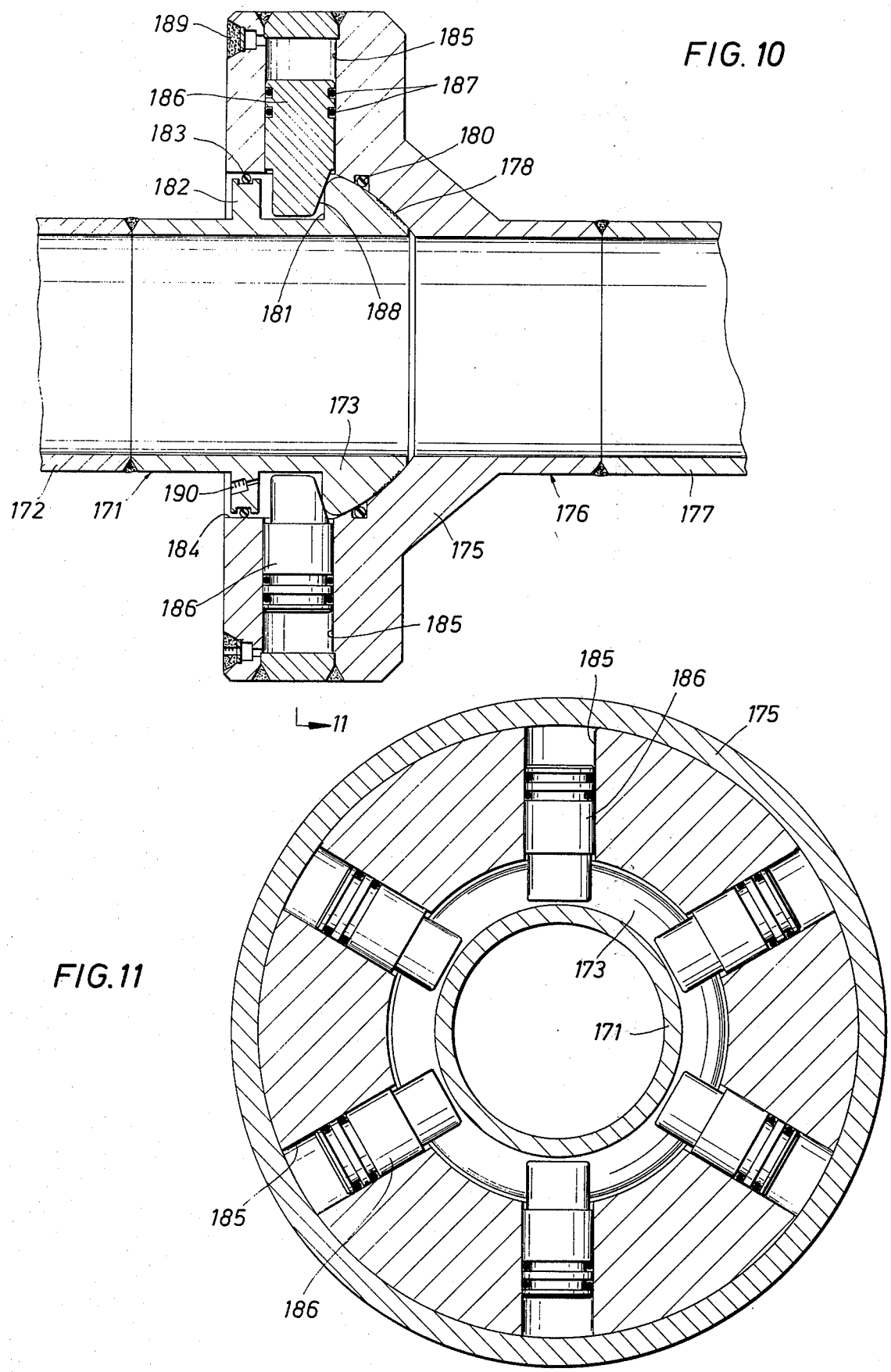

FLUID ACTUATED PIPE CONNECTION

CROSS-REFERENCE TO RELATED APPLICATIONS

This application is a continuation-in-part of applicant's prior copending application Ser. No. 189,686, filed Oct. 15, 1971, entitled "Ball and Socket Pipe Connection and Method" by the same applicant herein and now abandoned.

BACKGROUND OF THE INVENTION

1. Field of the Invention

This invention relates to a fluid actuated pipe connection and method. More particularly, it relates to a pipe coupling which is actuated by fluid pressure force, as for example pressurized hydraulic fluid, and which includes an enlarged portion such as a ball, a flange or the like attached to one coupling member and a housing forming a socket attached to the other coupling member and arranged for receiving the enlarged portion thereinto in sealing engagement.

2. Description of the Prior Art

In many environments and locations where two pipes are to be joined or interconnected, it is very difficult to align the pipes or flanges perfectly in order to effect a connection thereof. Such situations exist in difficult working environments such as underwater or subsea locations. Hence, it is desirable to have a coupling which can accommodate a certain amount of misalignment between the two pipes which are to be connected. Many ball and socket type pipe couplings have been provided by the prior art, but none are fully satisfactory for various reasons. Certain of such prior art couplings have mechanical means for locking the ball in the socket, which mechanical means require manipulation of the coupling in the difficult working environment and do not permit remote operation, or simultaneous actuation of a plurality of slips or gripping means, or uniform gripping pressures on all slips, or quick operation, and the like. Certain other prior art ball and socket type couplings which may be hydraulically actuated do not provide a rigid coupling and are therefore subject to increased wear as a result of flexing caused by wave action or the like. There is also a need for means to test the seal on the ball and socket coupling once the seal had been actuated since such testing means insures that a proper seal has been effected.

Further, there has also developed a need for a quick connect and disconnect coupling which may accommodate pipe misalignment, but which can be completed without conventional bolts or the like, and which requires a minimum amount of axial force to couple and uncouple.

SUMMARY OF THE INVENTION

It is therefore an object of this invention to provide an improved coupling and method for effecting the connecting of two pipes or the like.

Briefly stated, this invention relates to an apparatus for connecting the ends of two pipes or the like. The apparatus includes a pair of coupling members, each of which is adapted for connection at one end thereof to the end of one of the pipes which is to be connected. One of the coupling members has attached at the other end thereof a radially outwardly enlarged portion in the form of a ball or flange or the like which has axially forward and rearward sides. A housing is attached to the other end of the other coupling member, which housing may be in the form of a socket to receive the forward side of the enlarged portion in generally mating engagement therewith. The apparatus includes a plurality of generally radially movable discrete cam or latching members supported in radially retracted positions in the housing. These cam members are arranged for generally radially inward movement into camming and locking engagement with the rearward side of the enlarged portion. Means are provided for applying a fluid pressure, such as pressurized hydraulic fluid, to actuate the cam members radially inward into engagement with the rearward side of the enlarged portion, to thereby urge the enlarged portion into locking engagement with the housing and thereby couple the pipes together.

It is to be understood that the enlarged portion can take many forms, as for example, the enlarged portion may be in the shape of a section of a sphere, as is shown with certain embodiments hereinafter described. Alternatively, the enlarged portion may take the form of a flange, which flange may have a forward side tapered radially inwardly, as well as a rearward side which may also be tapered radially inwardly in the opposite axial direction. Further, the forward side of the flange type enlarged portion may be in the shape of a sphere. However, it is important that the locking or cam members be arranged for continuously engaging the rearward side of the ball or flange, as the case may be, for positively urging the locking the same into engagement with the socket or housing.

For the purposes of this application, the term "an annular radially outwardly enlarged portion" is meant to cover both the ball type enlargements as well as the flange type enlargements discussed above.

In certain embodiments, the enlarged portion or ball and/or the socket portion or housing may be attached to the respective couplings such that the central axes thereof are inclined at an angle with respect to the central axes of the couplings to which each is attached, thereby accommodating additional misalignment of the pipes by rotation of one coupling member relative to the other coupling member.

Certain embodiments of the invention may include means for applying a pressurized fluid to urge the cam members generally radially outwardly to the disengaged position whereby the couplings may be uncoupled. Further, the forward side of the enlarged portion may be provided with annular teeth for engaging the housing upon actuation of the cam members to thereby provide increased sealing and a more rigid coupling. The seal means may be arranged for actuation by pressurized fluid applied to the housing from an external source, such that the sealing is of a more positive nature. Means may also be provided for testing the effectiveness of the seal, and/or backing up the seal, as is explained hereinafter.

The method of this invention for interconnecting two pipes includes the steps of providing a first coupling member with an annular radially outwardly enlarged portion on one end thereof, with the enlarged portion having axially forward and rearward sides, with the forward side defining a section of a ball or sphere. It also includes attaching the other end of the first coupling to one of the pipes. The method includes providing a second coupling with a housing on one end thereof, which housing is arranged to receive the forward side of the enlarged portion in generally mating engagement therewith. The coupling members are moved generally axially together whereby the enlarged portion is positioned in the housing. A plurality of discrete cam members is supported generally between the enlarged portion and the housing in circumferentially spaced about positions. These cam members are actuated to the locking positions by applying pressurized fluid to the housing to thereby move the cam members radially inwardly to thereby urge and lock the enlarged portion in the housing. The cam members are maintained in positive contact with the enlarged portion until such times as the couplings are to be disconnected. The other end of the second coupling is also attached to the other one of the pipes. In certain embodiments of the method, the couplings may be mounted over the ends of the pipes which are to be connected and attached thereto by application of fluid pressure to gripping and sealing means supported in the coupling members. In certain embodiments of the method, seal means may be supported between the enlarged portion and the housing and the effectiveness of the seal tested.

Reference to the drawings will further explain the invention.

BRIEF DESCRIPTION OF THE DRAWINGS

FIG. 10 is a partial generally central vertical sectional view through another alternate embodiment of the invention which is arranged to accommodate up to 4° of misalignment between pipes to be connected.

FIG. 11 is a cross-sectional view taken generally along line 11—11 of FIG. 10.

DESCRIPTION OF THE PREFERRED EMBODIMENTS

Figure 1:
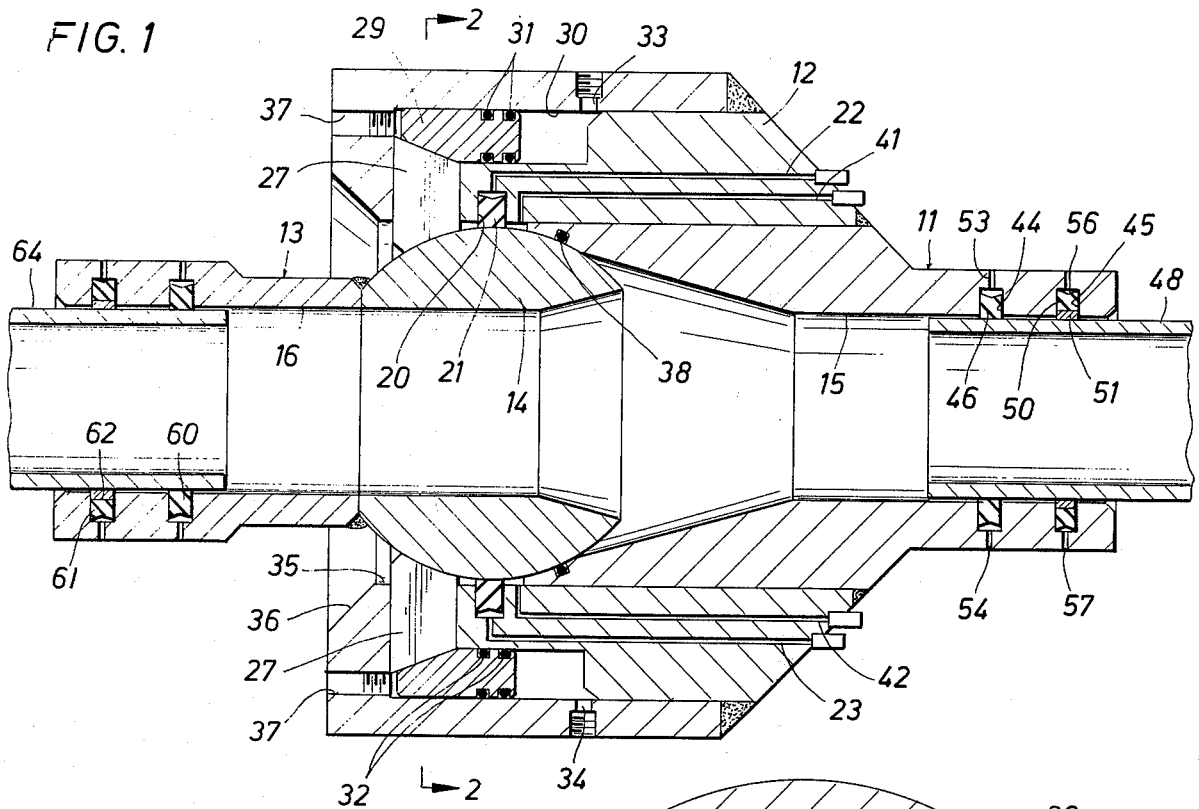
FIG. 1 is a generally central vertical sectional view through one preferred embodiment of the invention showing the ball portion of the coupling locked in the socket portion.
Figure 2:
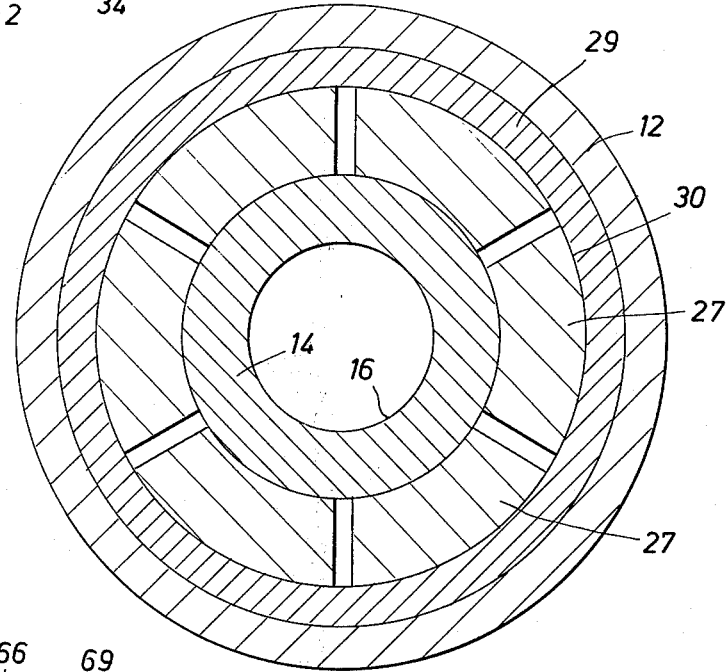
FIG. 2 is a generally cross-sectional view taken along line 2—2 of FIG. 1.

Referring now to FIGS. 1 and 2, a description of one preferred embodiment of the invention will be given. This embodiment of the coupling is generally comprised of a female coupling member 11 having a housing or socket portion 12 on one end thereof, and a male coupling member 13 having a spherically-shaped radially outwardly enlarged annular portion in the form of ball portion 14 on one end thereof. It will be noted that ball portion 14 is arranged and sized for matingly fitting a correspondingly spherically-shaped internal surface portion of socket portion 12, as shown.

For purposes of convenience, ball portion 14 will sometimes hereinafter be referred to as an enlarged portion attached to coupling member 13. It may also be described as having an axially forward side which extends from the point of largest cross-sectional diameter to the right, as viewed in FIG. 1. It may also be described as having an axially rearward side which extends from the point of largest cross-sectional diameter to the left, as shown in FIG. 1.

Coupling member 11 is provided with bore 15 therethrough and coupling member 13 is provided with bore 16 therethrough, whereby a conduit is provided through the coupling in the assembled position, as shown.

The internal surface of socket portion 12, at a point adjacent to ball portion 14, is provided with a first annular recess 20, in which is mounted ring seal 21. It is to be understood that, in cross-section, the radially outward side of ring seal 21 is provided with a "V" configuration and forms an annular chamber with the bottom of recess 20. In addition, ring seal 21 is preferably of a resilient elastomeric material such as rubber or the like. Moreover, ring seal 21 is arranged for radially inward deformation into sealing engagement with ball portion 14 upon actuation thereof. Means are provided in the form of inlet channel 22 through socket portion 12, with inlet channel 22 communicating with the annular recess formed between ring seal 21 and recess 20. The opposite end of inlet channel 22 may be provided with appropriate valves and couplings for attaching a line leading to a source of a pressurized fluid, as for example pressurized hydraulic fluid. Hence, upon application of hydraulic fluid through inlet channel 22, ring seal 21 is caused to move radially inwardly into sealing engagement with ball portion 14. In certain instances, it may be desirable to use epoxy resin as the pressurizing medium which would, upon hardening, become set, thereby providing a more permanent seal. In certain instances, it may be desirable to first pressure set ring seal 21 by hydraulic pressure followed by liquid epoxy resin, in which instance it is desirable to provide the invention with outlet channel 23 communicating with the annular chamber back of ring seal 21 on the opposite side from inlet channel 22. In this instance, outlet channel 23 would be provided with valve means at the exit thereof for opening and closing communications through outlet channel 23 at the desired times.

The invention also includes fluid pressure actuated means for camming and locking the ball portion in the socket portion. These means conveniently take the form of a plurality of discrete cams or locking inserts 27 mounted in another annular recess provided toward the left end of socket portion 12, as viewed in FIG. 1. Locking inserts 27 are arranged for generally radially inward movement to the locking position, as shown in FIG. 1, in response to a fluid actuated force. Locking inserts 27 may be provided with teeth or other friction type surfaces for engaging the external surface of ball portion 14. Hence, in certain instances, it is desirable to apply sufficient pressure to cause locking inserts 27 to not only lock with ball portion 14, but to grip it with sufficient frictional force so as to prevent any flexing between coupling member 11 and coupling member 13 after actuation of the coupling to thereby provide a rigid connection. Such rigid coupling may be desirable in undersea or underwater locations where wave action might other wise be deleterious to the long-term life of the coupling.

A fluid actuated force for moving locking inserts 27 to the locking position conveniently is derived from an annular piston 29 mounted in annular piston chamber 30 formed in socket portion 12 and generally radially outside of locking inserts 27, as shown. Annular piston 29 may be provided with a pair of O-ring seals 31—31 along the outside thereof and a pair of O-ring seals 32—32 along the internal surface thereof for sealing with socket portion 12. In addition, annular piston chamber 30 is also provided with inlet means in the form of valved inlet port 33 and valved outlet port 34. Hence, pressurized hydraulic fluid may be applied through inlet port 33 while the air in annular piston chamber 30 is evacuated through outlet port 34. At such time as annular piston chamber 30 is evacuated of air, outlet port 34 may be closed and continued hydraulic fluid pressure applied to annular piston chamber 30, with the result that annular piston 29 is driven axially to the left, as viewed in FIG. 1.

The left end of annular piston 29 is provided with a beveled internal surface which mates with a beveled end surface on locking inserts 27, with the result that locking inserts 27 are cammed radially inwardly into the locking position shown in FIG. 1. Moreover, the end of socket portion 12 is also provided with a pair of outlet ports 37—37 for evacuating any air or other extraneous fluids that might be trapped at the left end of annular piston 29, as viewed in FIG. 1. As inserts 27 are cammed radially inward, they engage the rearward side of ball portion 14 and urge it into mating engagement with socket portion 12. By way of example, it has been found that the application of 8000 psi of fluid pressure in chamber 30 will cause setting of inserts 27 with sufficient force that the coupling becomes rigid and will withstand bending moments greater than the bending moment of the pipe being connected. It follows, in the result, that each cam 27 and the spherically-shaped internal surface portion of housing 12 are mutually dependent on each other to prevent relative axial and flexing movement between coupling members 11 and 13, thereby providing such rigid connection. Further, the angular shape of the radially outward ends or sides of inserts 27 is preferably at an angle of less than 45° with respect to the longitudinal axis of coupling member 11, and preferably on the order of 20° taper. This causes a multiplier effect between the outward cam surfaces of inserts 27 and the mating cam surface of piston 29. Accordingly, the ball and socket coupling can be made rigid with a minimum of hydraulic pressure.

In addition to the foregoing, socket portion 12 is provided with an annular end opening 35 and a beveled annular surface 36 adjacent thereto the facilitate the guiding of ball portion 14 into socket portion 12, as shown.

In certain instances, it is desirable to have means for testing the effectiveness of the seal formed by ring seal 21 with the external portion of ball portion 14. In such cases, socket portion 12 may be provided with another seal generally axially spaced apart from ring seal 21. For convenience, this may take the form of an annular O-ring seal 38 mounted in an annular recess generally axially to the right of ring seal 21 as shown in FIG. 1. It is to be understood that O-ring seal 38 is slightly larger in diameter than the depth of the recess in which it is mounted and therefore effects a positive seal between socket portion 12 and ball portion 14 upon actuation of locking inserts 27, as shown in FIG. 1. There is thus formed an annular chamber about ball portion 14 between ring seal 21 and O-ring seal 38, which annular chamber is designated by the numeral 39.

Means are provided for fluid pressurizing annular chamber 39 for testing the effectiveness of seal ring 21. These means conveniently take the form of a valved inlet channel 41 communicating with annular chamber 39 and which may be connected to any suitable source of pressurized fluid, as for example a source of pressurized hydraulic fluid or pressurized epoxy resin. Means are also provided for evacuating any air from annular chamber 39 and these means take the form of valved outlet channel 42, also through socket portion 12 and communicating with annular chamber 39 at circumferentially spaced apart position from inlet channel 41. Outlet channel 42 may be provided with valve means to control the flow of fluid therefrom, as for example the flow of air therefrom when hydraulic oil is first applied to annular chamber 39. Thereafter, it may be manipulated to flow hydraulic oil from annular chamber 39 when pressurized epoxy fluid is flowed into chamber 39 for effecting a more permanent setting or coupling.

Either coupling member 11 or coupling member 13, or both, may be provided with fluid pressure actuated means for rigidly attaching the opposite ends thereof to an adjacent pipe member. For example, socket portion 12 may be provided at the end opposite end opening 35 with a pair of spaced apart annular recesses 44 and 45. Recess 44 may be provided with an annular V-ring seal 46 which is similar to ring seal 21 and arranged for inward radial deformation into sealing engagement with the external surface of the end of pipe 48, for example. Further, recess 45 may be provided with an annular V-ring seal 50 which is arranged for supporting on the inward side thereof a plurality of gripping inserts 51 which are in the form of slips arranged for frictionally engaging the external surface of pipe 48 and locking therewith.

Recess 44 is communicated to through valved inlet port 53 and outlet port 54 whereby fluid pressure can be applied to V-ring seal 46 to deform the same radially inward into the sealing position shown. In addition, recess 45 is communicated with by valved inlet port 56 and outlet port 57. Similarly, V-ring seal 50 and gripping inserts 51 may thereby be actuated to the gripping position by application of fluid pressure through inlet port 56 and control of outlet port 57. Thus, there is provided fluid pressure actuated means for rigidly attaching the other end of female coupling member 11 to a pipe and completing a fluid conduit through the coupling. Moreover, coupling member 13 may also be provided with similar sealing and gripping means in the form of an annular seal ring 60 which is similar to V-ring seal 46 and an annular ring seal 61 similar to V-ring seal 50 and arranged for supporting gripping inserts 62 whereby, upon actuation thereof, coupling member 13 may be rigidly and sealingly attached to pipe 64 inserted into the end thereof, as shown.

There is thus provided a coupling device which can be used to couple the ends of two pipes, for example pipes 48 and 64, in a difficult working environment, and which coupling can be effected by the application of fluid pressure actuated force which will greatly facilitate installation of such coupling in a difficult working environment, thereby eliminating the need for underwater welding or underwater manipulation of mechanical means for effecting completion of the coupling between the two pipes. This embodiment is arranged to accommodate up to 20° of axial misalignment between the two pipes which are to be joined, and can be used to make a rigid connection which will not flex or bend, which has not been possible with prior art ball and socket couplings.

In operation, the coupling device shown in FIGS. 1 and 2 is utilized by maintaining annular piston 29 in the retracted position in annular piston chamber 30 and with locking inserts 27 also in the retracted position. In that position, coupling member 11 is mounted over the end of pipe 48 and coupling member 13 is mounted over the end of pipe 64. Coupling member 11 and coupling member 13 are freely moved generally axially together to bring ball portion 14 into engagement with the socket of socket portion 12. Thereafter, locking inserts 27 are actuated into the locking position by the application of fluid pressure to annular piston chamber 30, thereby driving annular piston 29 to the left and camming locking inserts 27 radially inwardly into positive locking positions, where inserts 27 urge ball portion 14 into engagement with socket portion 12. Coupling member 11 can be rigidly attached to pipe 48 by actuation of V-ring seal 46 and gripping inserts 51. Similarly, coupling member 13 may be rigidly connected to pipe 64 by actuation of ring seal 60 and gripping inserts 62 described above.

Sealing between socket portion 12 and ball portion 14 can be further enhanced by application of fluid pressure to ring seal 21 as described above and the seal can be tested by the application of fluid pressure to annular chamber 39 as discussed above.

Once it is determined that all the seals are effectively in sealing engagement with their respective sealing members, epoxy fluid may be applied to the seals if it is desired to have a permanent connection of pipes 64 and 48. Moreover, by providing locking inserts 27 with gripping teeth on the surface adjacent to the external surface of ball portion 14 and with the application of sufficient pressure to prevent rotation of ball portion 14 with socket portion 12, there is effected a permanent and rigid connection therebetween with the advantages discussed above. If it is desirable that the coupling be maintained flexible, then the engaging surfaces of locking inserts 27 would not be provided with gripping teeth, but rather with a smooth surface which would then mate with the external surface of ball portion 14.

There are many advantages to having hydraulic actuation of the locking means, including remoteness of operation, simultaneous actuation, uniform pressure actuation and quick operation, for example.

Figure 3:
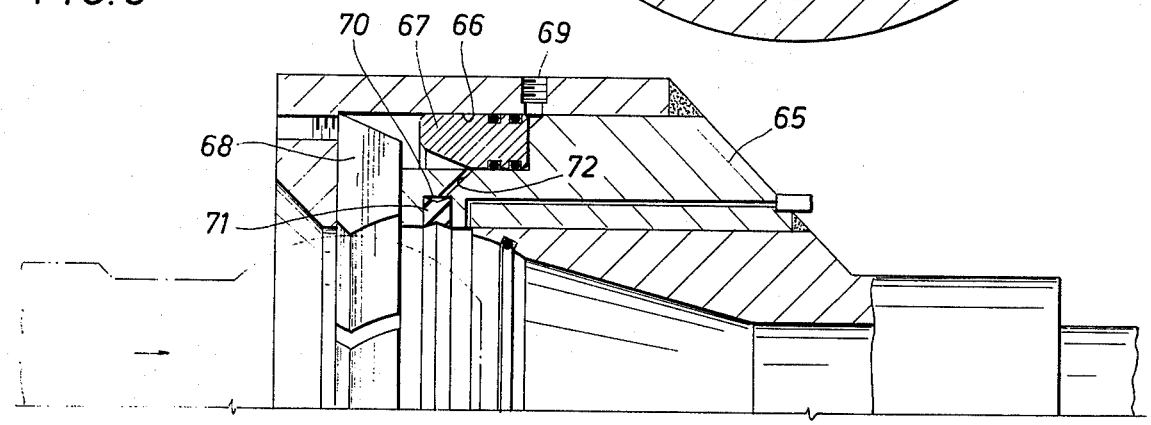
FIG. 3 is a partial central vertical sectional view somewhat similar to the view of FIG. 1, but showing an alternate embodiment of the means for actuating the sealing means.

Referring now to FIG. 3, an alternate embodiment of the socket portion of the invention will be discussed, which socket portion is identical with socket portion 12 of the embodiment shown in FIG. 1, modified to the extent which will now be described.

In this embodiment, socket portion 65 is provided with an annular piston chamber 66 which is identical to annular piston chamber 30 of the previous embodiment. Annular piston chamber 66 has mounted therein annular piston 67 which is identical to annular piston 29 of the FIG. 1 embodiment. Further, socket portion 65 has mounted therein a plurality of locking inserts 68 which are identical in form and operation to locking inserts 27 and are cammed radially inwardly by application of fluid pressure to the rearward side of annular piston 67 through inlet port 69.

Further, socket portion 65 is provided with an annular recess 70 about the internal circumference thereof, which recess is identical to annular recess 20 of the previous embodiment. Recess 70 has mounted therein annular ring seal 71 which is identical to ring seal 21 of the prior embodiment and is arranged for radially inward deformation by the application of fluid pressure to the radially outward side thereof. However, in this embodiment, the fluid pressure to the rearward or radially outward side of ring seal 71 is provided through inlet channel 72 communicating between annular piston chamber 66 and annular recess 70 radially outward of ring seal 71. Hence, ring seal 71 is not actuated until sufficient fluid pressure has been applied to annular piston chamber 66 to drive annular piston 67 to the left, as viewed in FIG. 3, thereby effecting setting of locking inserts 68. At this point, annular piston 67 will have cleared end of inlet channel 72, thereby permitting fluid pressure to be exerted through inlet channel 72, to thereby radially deform ring seal 71 into engagement with the ball member inserted in socket portion 65. In all other respects, the operation of the embodiment shown in FIG. 3 is identical to that shown in FIGS. 1 and 2. FIG. 3 may have certain advantages in that it requires only one pressure line or source of pressurized fluid for effecting setting of both the sealing and locking means, which pressure may be applied in one step to set the sealing means and the locking means.

Figure 4:
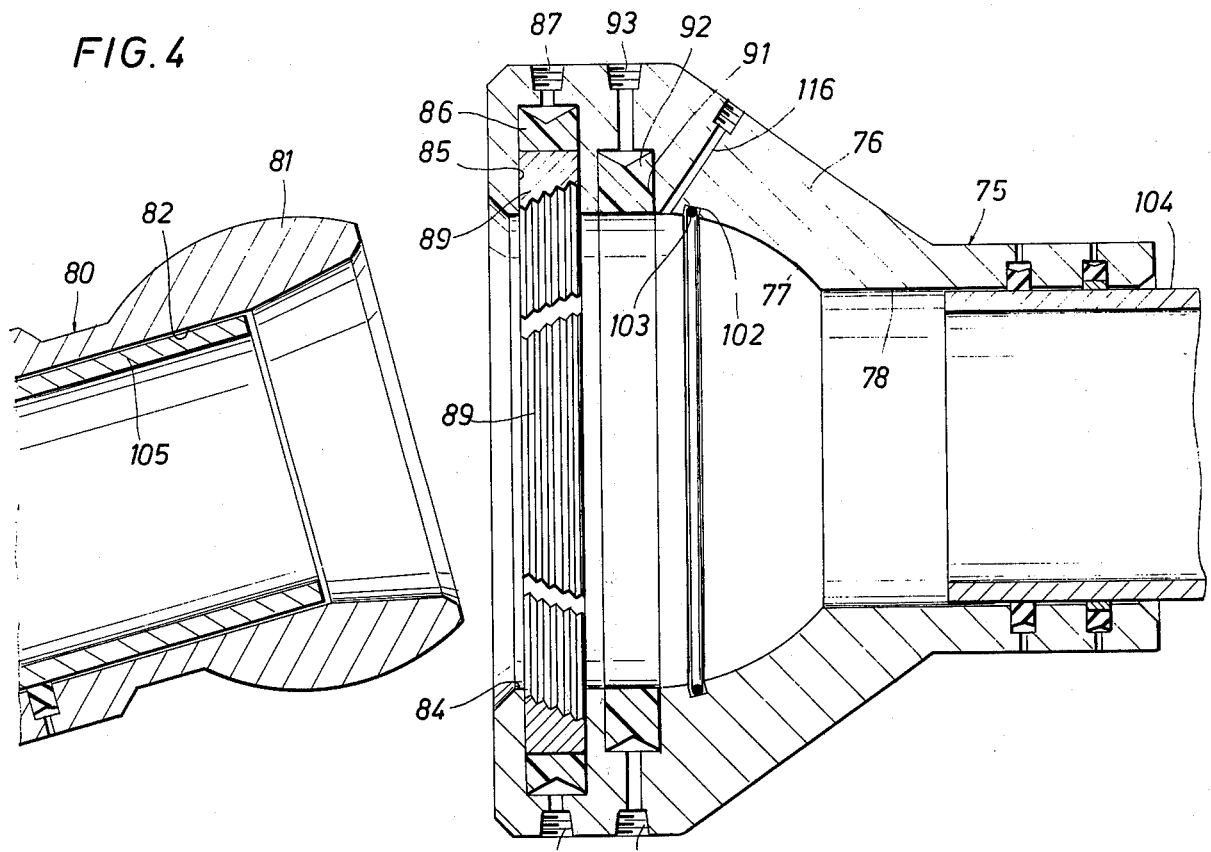
FIG. 4 is also a central vertical sectional view of an alternate embodiment of the coupling of this invention showing the ball portion of the coupling prior to insertion thereof into the socket portion.
Figure 5:
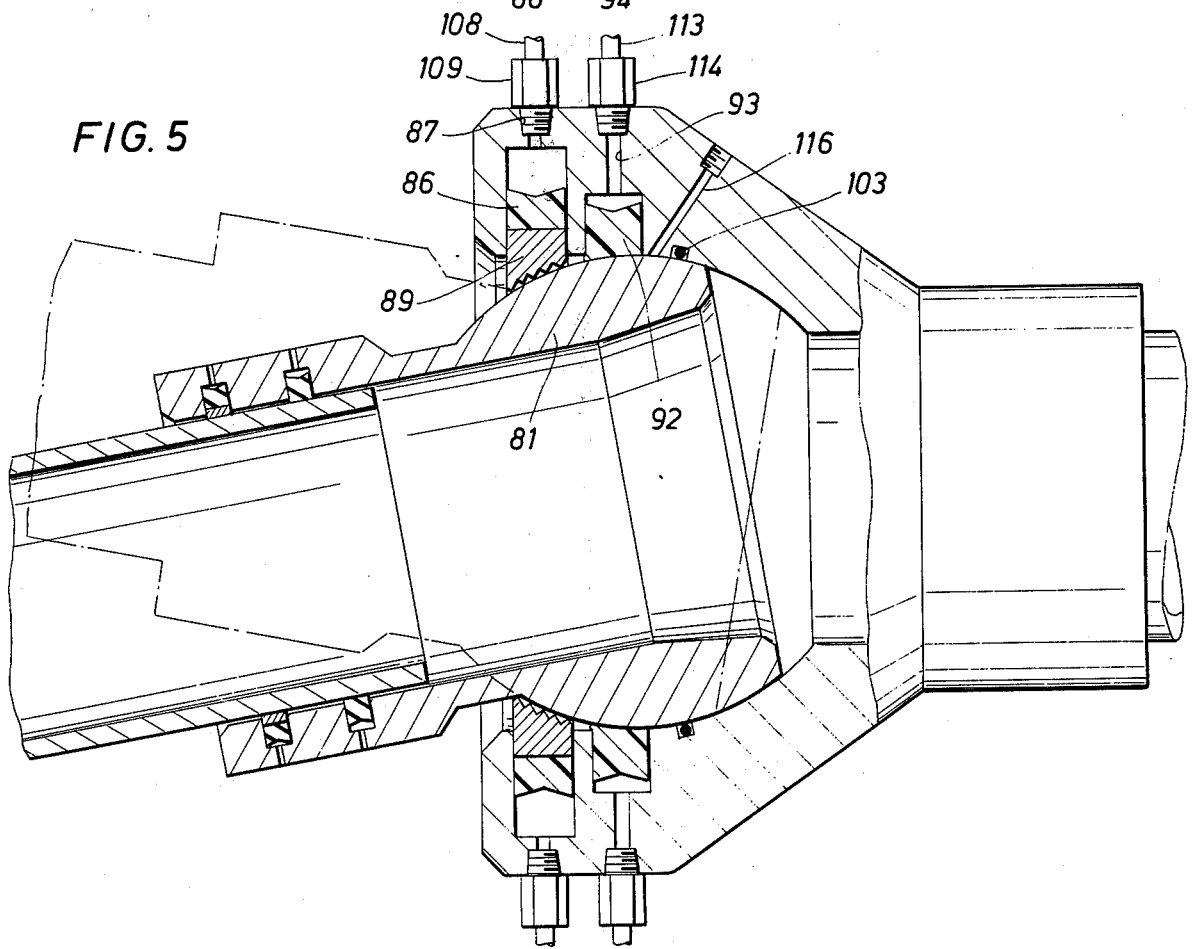
FIG. 5 is a central sectional view similar to FIG. 4, but showing the ball portion of the coupling locked in the socket portion.

Referring now to FIGS. 4 and 5, another alternate embodiment of the device of this invention will be described. The embodiment shown in FIGS. 4 and 5 operates in a manner similar to that shown with respect to the previous embodiments, but its construction is somewhat different.

In this embodiment, female coupling member 75 is provided with a socket portion 76 having an internal surface 77 which is generally hemispherical in at least a portion thereof, which surface extends to bore 78 of coupling member 75 to provide a conduit therethrough.

The coupling device also includes a male coupling member 80 having a ball portion 81 on one end thereof, which ball portion is arranged for mating in socket portion 76 in the assembled position. In addition, male coupling member 80 has an internal bore 82 which communicates therethrough and which provides a conduit through the coupling device in the assembled condition.

The left end of coupling member 75 is provided with an axial opening 84 therein and has an annular recess 85 adjacent opening 84. Recess 85 has mounted therein and supports an annular insert support ring 86 which is of an elastomeric material such as rubber, or the like and is provided with a V-groove about the external periphery thereabove, which groove forms a chamber with the bottom of recess 85. Communication to the annular recess thereby formed is provided through valved inlet port 87 and outlet port 88. In addition, support ring 86 abuts against the radially outward side of a plurality of gripping inserts 89 spaced circumferentially about recess 85 and are held therein by a minimum frictional fit. Gripping inserts 89 are provided with teeth on their radially inward side which are arranged to positively grip and lock with the external surface of ball portion 81. Gripping inserts 89 are moved to the locking and setting position by application of fluid pressure through inlet port 87, which fluid pressure causes support ring 86 to be deformed or moved radially inwardly, similar to the inserts of the previous embodiment. By using epoxy fluid as the pressurizing medium, a more permanent installation and locking can be accomplished.

Socket portion 76 also is provided with another annular recess 91 which is axially adjacent recess 85 and is generally similar thereto. Recess 91 has annular V-ring seal 92 mounted therein which is similar to ring seal 21 of the prior embodiment. V-ring seal 92 is arranged to be deformed radially inwardly into sealing engagement with ball portion 81 upon the application of pressurized fluid, such as epoxy fluid, into the annular chamber radially outwardly of V-ring seal 92, which pressurized fluid is applied through valved inlet port 93, while air may be evacuated through valved outlet port 94.

Means are also provided in this embodiment for testing the effectiveness of the seal provided by seal ring 92 upon actuation thereof. Hence, there is provided another annular recess 102 axially adjacent to, but of somewhat smaller dimensions than, recess 91. Recess 102 has mounted therein an O-ring seal 103 which has somewhat larger dimensions than the depth of recess 102 so as to provide a positive seal with ball portion 81 when the same is mounted in socket portion 76.

In addition, the opposite ends of coupling member 75 and coupling member 80 are each provided with pressure actuated gripping and sealing means which may be of identical configuration to that of the FIG. 1 embodiment, for example, and hence will not be described in detail. Suffice it to say that coupling member 75 is arranged for inserting over and being rigidly and sealingly attached to pipe 104 and coupling member 80 is arranged for fitting over and rigidly and sealingly attached to pipe 105 in the same manner as with the prior embodiments.

In operation, coupling member 80 is placed over the end of pipe 105 and coupling member 75 is placed over the end of pipe 104. Thereafter, coupling member 80 and coupling member 75 are brought together with ball portion 81 being inserted into the socket of socket portion 76, as shown in FIG. 5. Thereafter, gripping inserts 89 are actuated by application of fluid pressure through pressure line 108, adaptor 109 and through inlet port 87, whereby support ring 86 is deformed radially inwardly, thereby actuating gripping inserts 89 to the locking and gripping position with the ball portion 81, as shown in FIG. 5, whereby ball portion 81 is urged into engagement with socket portion 76. It is to be understood that pressure line 108 is connected to any suitable source of pressurized fluid, such as hydraulic fluid or pressurized epoxy resin. V-ring seal 92 is also set by the application of a fluid pressure through pressure line 113, adapter 114 and inlet port 93. It is to be understood that in the aforesaid pressurizing operation, outlet ports 88 and 94 are controlled so as to evacuate undesired fluids, such as air, and are then closed in order to effect pressurization as described above. Hence, at this point, V-ring seal 92 is set as shown in FIG. 5 and gripping inserts 89 are also set, as shown.

It is now desirable to test to determine whether or not an effective seal has been provided by V-ring seal 92 and, hence, means are provided for testing this seal. These testing means include the provision of a valved inlet port 116 through the wall of socket portion 76 with the inward end terminating at a spot or place in the annular space intermediate between V-ring seal 92 and O-ring seal 103, as shown. V-ring seal 92 can then be tested by applying a pressurized fluid, such as hydraulic fluid or epoxy resin, through inlet port 116. Any loss of pressure therethrough would indicate an improper sealing of the sealing means and adjustments can then be properly made. If it is determined that an appropriate seal has been made, the coupling operation may be completed by thereafter rigidly attaching each of the coupling members to the respective pipes over which they are mounted in the same manner as described in the previous embodiment. Moreover, if the locking and sealing operations have been performed with hydraulic fluid initially, the hydraulic fluid may be replaced by pressurized epoxy resin which will set up in a short period of time to provide a permanent installation.

It should be noted that with this embodiment, as with the previous embodiment, gripping inserts 89 are arranged for positively frictionally engaging ball portion 81 and, if sufficient force is applied thereto, can prevent any flexing between the two coupling members 75 and 80, which may be desirable in certain installations, also as described above. Alternatively, gripping inserts 89 may have the teeth eliminated therefrom and only sufficient pressure applied thereto to create a locking condition such that some flexing may be permitted between the two coupling members 75 and 80.

This embodiment, as with the previous embodiment, provides for the coupling of two pipes having up to 20° of axial misalignment. Moreover, it provides a device and method for effecting a rigid coupling in a difficult working environment, as for example in a subsea location, wherein the tool can be installed by the application of the desired hydraulic fluid pressure or fluid actuated force, without the necessity for reliance upon mechanically setting, sealing and locking means. Further, means are provided for testing the effectiveness of the seal prior to passage of fluids through the pipes which are joined, thereby increasing the safety of the installation and operation of the tool. One further advantage of the FIGS. 4 and 5 embodiment is that the ball and socket portions can be more easily disconnected than the previous embodiments. Hence, by utilizing hydraulic fluid as the setting medium to lock and seal the two together, they may thereafter be separated by first relieving the hydraulic fluid pressure. This arrangement is an advantage in certain situations where it is desirable to have a disconnectable coupling. It will thus be apparent that this invention provides the art with a significant improvement in the art of pipe couplings, and particularly in the art of ball joint couplings, which can accommodate misaligned pipe and which coupling can be operated to provide a rigid connection.

Figure 6:
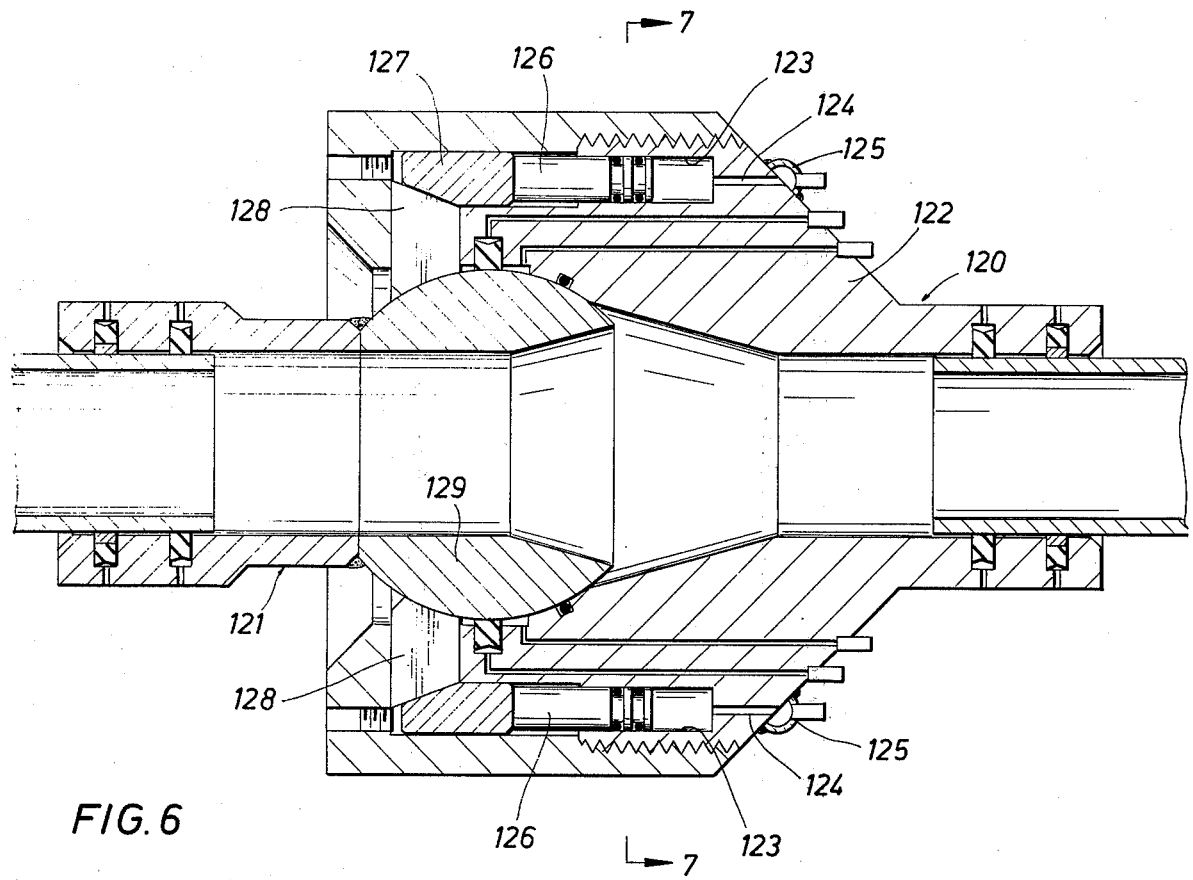
FIG. 6 is a central vertical sectional view of a still further alternative embodiment of the invention which is generally similar to that shown in FIG. 1, but having somewhat modified piston means in the form of a plurality of discrete pistons.
Figure 7:
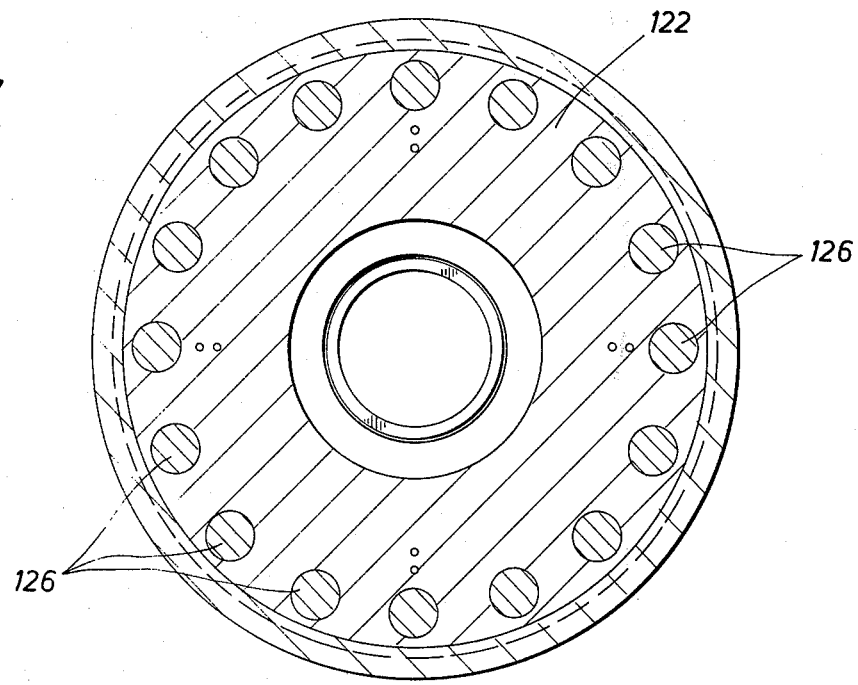
FIG. 7 is a cross-sectional view taken along line 7—7 of FIG. 6.

Referring now to FIGS. 6 and 7, a further alternative embodiment of the invention will be described. This embodiment is generally similar to the embodiment shown in FIGS. 1 and 2, but has a somewhat different form of piston means for actuating the gripping or locking means. In this embodiment, female coupling member 120 is shown joined with male coupling member 121, the latter of which may be similar to or identical with male coupling member 13 of the FIG. 1 embodiment. Female coupling member 120 is provided with a socket portion 122 having a plurality of axially extending individual or discrete piston cylinders 123 spaced circumferentially thereabout. Each of the cylinders 123 is communicated to through a valved inlet channel 124 which is connected to a common manifold, as for example manifold 125, which in turn is connected to an appropriate source of pressurized fluid such as hydraulic fluid.

Each of the cylinders 123 has mounted therein a cylindrical piston 126 having appropriate seal means thereabout for sealing with the internal surface of cylinder 123. The left end of each of the pistons 126, as viewed in FIG. 6, is arranged for abutting against an annular thrust ring 127 which is generally similar to annular piston 29 of the FIG. 1 embodiment. Thrust ring 127 has an annular inwardly beveled inner surface which is arranged to engage and cam radially inwardly a plurality of locking inserts 128 which are similar to locking inserts 27 of the FIG. 1 embodiment. Locking inserts 128 are arranged for urging and locking ball portion 129 of male coupling member 121 into the locked position shown in FIGS. 6 and 7.

In operation, the FIGS. 6 and 7 embodiment initially has pistons 126 in the retracted position and locking inserts 128 in the withdrawn position. Ball portion 129 is then inserted into socket portion 122 of female coupling member 120. Thereafter, pressurized fluid is applied to manifold 125 which drives pistons 126 left as viewed in FIG. 6, resulting in the displacement of annular thrust ring 127 to the left, also. This movement of thrust ring 127 cams locking inserts 128 radially inwardly into the locking position with ball portion 129, whereby ball portion 129 is urged into engagement with socket portion 122.

In other respects, construction and operation of the FIGS. 6 and 7 embodiment is identical with the FIGS. 1 and 2 embodiment. The FIGS. 6 and 7 embodiment has one advantage in that it may be useful in larger diameter couplings wherein providing a seal about the piston means is a greater problem, which problem is more easily solved by the individual or discrete pistons and cylinder arrangement thus shown.

Figure 8:
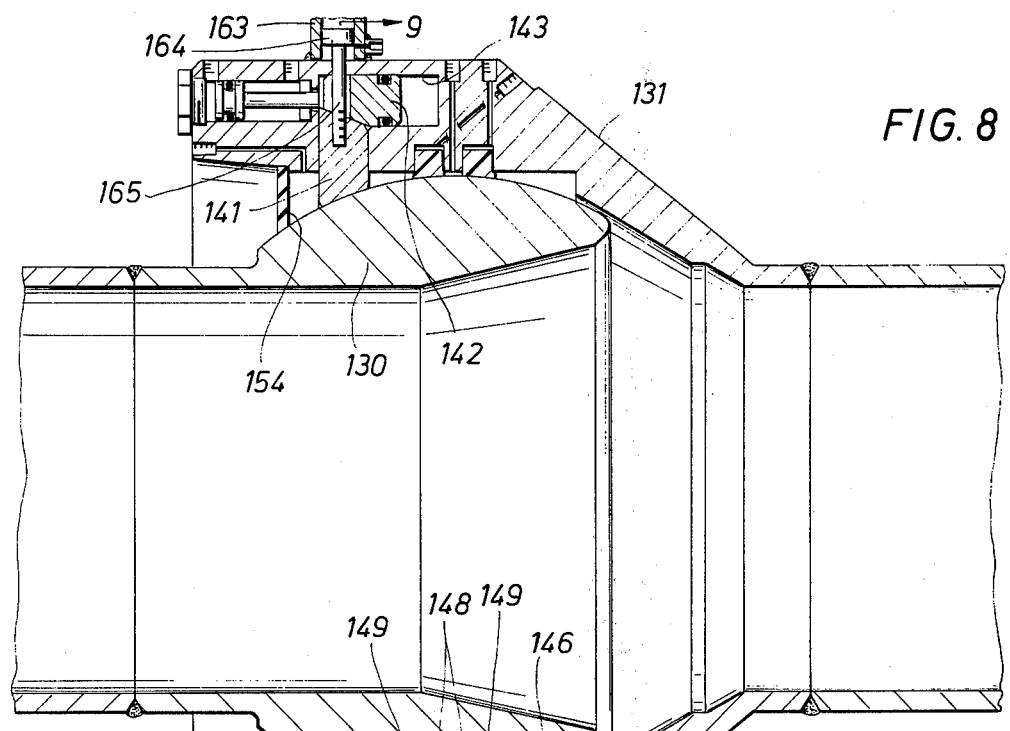
FIG. 8 is a central vertical sectional view of another alternative embodiment of the invention, but showing means for positively unlocking the locking means.
Figure 9:
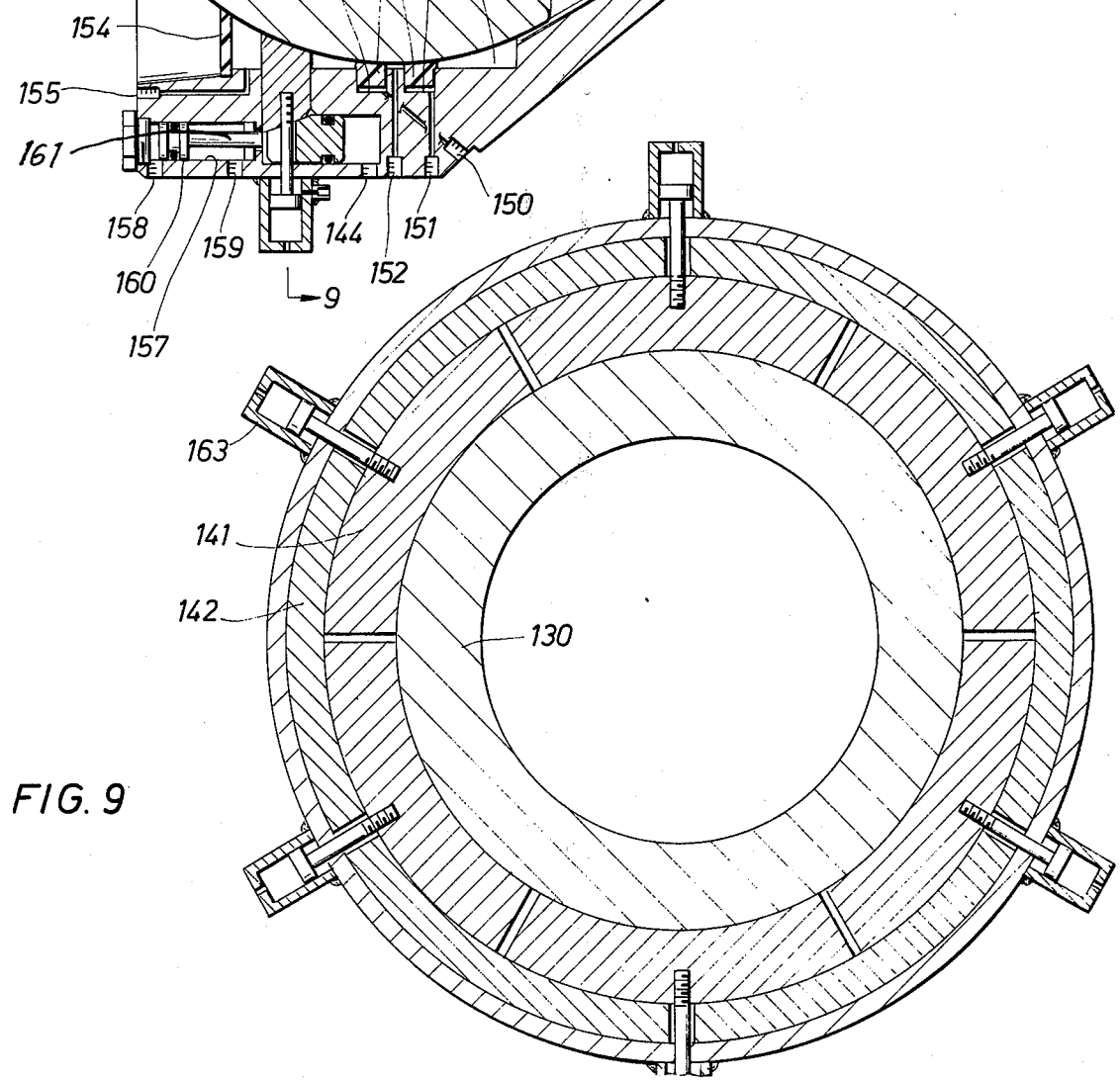
FIG. 9 is a cross-sectional view generally taken along line 9—9 of FIG. 8.

Referring now to FIGS. 8 and 9, another embodiment of the invention will be described. Ball 130 is formed on the exterior thereof with a spherical portion which is arranged for mating in socket housing 131 as shown, particularly in FIG. 8, and is sealingly latched therein.

The latch means for latching the ball 130 to socket housing 131 are in the form of a plurality of radially movable slips 141, circumferentially spaced about inside housing 131, as shown. The radially inward ends of slips 141 are curved to match the spherical surface of ball 130, and when actuated radially inwardly to the position shown, lock ball 130 in socket housing 131. The radially outward ends of slips 141 are angularly aligned and arranged for sliding and camming contact by an annular locking piston 142, which is arranged for generally axially sliding movement in chamber 143, provided in housing 131. Chamber 143 is communicated to through valved inlet 144, which is arranged for connection to a hydraulic line at predetermined times. Hence, upon the application of hydraulic pressure to chamber 143, piston 142 is urged axially to the left as shown in FIG. 8, thereby contacting and camming slips 141 radially inwardly and to the latching or locking position with ball 130 as shown.

Housing 131 also supports a ball seat 146 of bronze or the like which is supported in an annular recess about the inside of housing 131 with the inner surface of seat 146 arranged for mating engagement with ball 130 as shown. Housing 131 also provides means for effecting a fluid type seal between housing 131 and ball 130 and these conveniently take the form of a pair of annular elastomeric sealing rings 148, each of which is mounted in an annular chamber 149 to form an annular closed chamber therewith. Housing 131 is provided with valved packer pressure inlets 150 which communicate to the chamber behind one of the seals 148 and another plurality of valved packing pressure inlets 151 which communicate with the chamber behind the other seal 149. Hence, by the application of hydraulic pressure in inlets 150 and 151, seals 149 are urged radially inwardly into sealing engagement with ball 130 as shown. It will be noted that each of the sealing rings 148 is mounted on each side of the apex of ball 130 to provide more positive sealing.

Means are provided for testing the effectiveness of the seal and these take the form of a plurality of valved pressure testing inlets 152 which communicate with the annular space between seals 148 and between ball 130 and housing 131. After seals 148 are set, application of hydraulic pressure through inlets 152 will determine whether or not an effective seal has been made.

The left portion of housing 131, as shown in FIG. 8, is also provided with an annular flexible elastomeric grease retaining ring 154 to thereby effect a grease seal with ball 130. In order to restrict the flow of sea water into the socket housing 131, grease may be pumped into grease inlet 155 provided in the end of housing 131 to fill the annular spaces surrounding ball 130 to thereby prevent encroachment of corrosive sea water or the like. The couplings of this embodiment are arranged for connection to adjacent pipe as by welding or by an overfitting connection, as with the prior embodiments.

Means are also provided for giving a positive unlatching action when it becomes desirable or necessary to disconnect socket housing 131 from ball 130. The left end of housing 131, as shown in FIG. 8, is provided with a plurality of circumferentially spaced axially extending cylinders 157, the left ends of which each have a pressure inlet 158 and another inlet 159 on the other axial end thereof. It is to be noted that inlets 158 and 159 may be connected to common manifolds (not shown). Also mounted in each of the cylinders 157 is a piston 160 which is arranged for axial movement in cylinder 157. Each of the pistons 160 is provided with a reduced portion in the form of a rod 161 on the right end thereof, as viewed in FIG. 8, which rod is arranged for bearing against the axial adjacent end of annular locking piston 142. Hence, upon the application of pressurized fluid through inlets 158, pistons 160 are driven axially to the right causing annular locking piston 142 to move to the retracted position, which thereby frees slips 141 for movement radially outwardly to the unlocked position, at which point, fluid pressure is applied to inlets 159 to retract rods 161.

Means are also provided for giving a positive unlocking arrangement and this includes a plurality of cylinders 163 mounted circumferentially about the outside of socket housing 131, and in each of which is mounted a piston 164 which is connected to a connecting rod 165 which is attached to one of the slips 141. Hence, on the application of hydraulic pressure to the radially inward side of pistons 164, slips 141 are positively retracted to the unlocking position, at which point ball 130 may be removed from socket housing 131, provided hydraulic pressure has also been relieved behind packing rings 148.

It is to be noted that rods 161 and 165 are circumferentially offset so as not to interfere with each other.

In certain usages, it is desirable to make the ball and socket coupling of this invention inflexible, as for example in certain underwater locations where wave action causes continual flexing and excessive wear. It has been found that the ball and socket couplings of this invention can be made substantially inflexible by providing the external surface of ball portion 130 and/or the ball contacting surfaces of the slips 27, 89, 128 and 141 with roughened coatings of a wear resistent material such as tungsten carbide or the like. This not only increases the useful life of such slips, but permits them to be engaged by application of higher hydraulic pressures to the extent that the couplings become substantially inflexible as aforesaid.

Referring now to FIGS. 10 and 11, another embodiment of the coupling of this invention will be described. A first coupling member 171 is shown connected at the left end thereof to a pipe 172, as by welding, and on the right end thereof has attached an externally enlarged annular portion 173. Enlarged portion 173 has a forward side, or right side as viewed in FIG. 10, which describes a section of a sphere. Stated another way, the forward side of enlarged portion 173 is tapered radially inwardly. It may also take the shape of the radius of a circle in longitudinal section. The forward side of enlarged portion 173 is arranged for mating engagement as shown with socket or housing portion 175 of coupling member 176 the other end of which, i.e., the right end as viewed in FIG. 10, is connected to pipe 177, as by welding or the like. In certain embodiments, the forward side of enlarged portion 173 may be provided with a plurality of annular teeth 178 which are arranged for embedding in the mating surface of housing 175 to increase sealing therewith. Teeth 178 may be flame hardened to facilitate the embedding and sealing action and increase the rigidity of the coupling. It is to be understood that the annular teeth could be provided on the mating surface of housing 175 to achieve the same results. The mating surface of housing 175 is also provided with an annular recess in which is mounted an annular resilient seal 180 for sealing between enlarged portion 173 and housing portion 175, as shown.

The rearward or left side 181 of enlarged portion 173, as viewed in FIG. 10, is also tapered radially inwardly along at least a portion of the surface thereof and, in fact, is preferably tapered past the perpendicular by at least 4°.

Intermediate the ends of the first coupling member 171 there is provided thereabout an annular enlarged portion in the form of ring 182 which supports an annular seal 183 which is arranged for sealing with annular opening 184 in the end of housing portion 175, through which enlarged portion 173 is inserted in the initial step of makeup of the coupling.

Housing portion 175 is provided with a plurality of circumferentially spaced radially extending cylinder bores 185, the radially outward ends of which are closed off and the radially inward ends of which terminate adjacent annular opening 184, as shown. A cam member in the form of a piston 186 is mounted for radial movement in each of the cylinder bores 185. The radially outward ends of piston 186 have supported thereabout a pair of seal rings 187 for sealing engagement with cylinder bores 185 during reciprocation thereof. The radially inward ends of pistons 186 are provided with a tapered surface 188 on one side thereof which is arranged for camming engagement with rearward side 181 of enlarged portion 173, as shown in FIG. 10.

Means are provided for applying hydraulic pressure to actuate pistons 186 and this takes the form of an appropriately valved inlet 189 communicating with the radially outward end of each of the cylinder bores 185. Upon the application of fluid pressure, such as hydraulic pressure, through inlets 189, pressure is applied to the radially outward ends of pistons 186, whereby they are urged generally radially inwardly into engagement with the rearward side 181 of enlarged portion 173 and urge the forward side of enlarged portion 173 into engagement with the mating surface of housing portion 175.

Means are also provided for urging the pistons 186 to the disengaged position and this takes the form of a valved inlet 190 extending through ring 182 and communicating with the annular space between annular ring 182 and enlarged portion 173. Upon relieving pressure through inlets 189, the application of fluid pressure, such as hydraulic fluid, through inlet 190, pistons 186 are urged radially outwardly to the disengaged position. Thereafter, pressure is relieved through inlet 190 and the first coupling member 171 is disengaged from the second coupling member 176 by axially withdrawing the two apart.

In the foregoing embodiment, the coupling members 171 and 176 are arranged to accommodate up to 4° of axial misalignment between pipes 172 and 177. This misalignment is possible because the forward side of enlarged portion 173 and the mating surface of housing portion 175 describe the surface of a portion of a sphere in the same manner as the ball and socket couplings of the prior embodiments. However, the rearward side of enlarged portion 173 has a greater degree of taper, at least along a portion thereof, and is arranged to be engaged by pistons 186 so as to provide additional thrust force in completing the coupling. The provision of annular ring 182 tends to restrict the amount of misalignment which can be accommodated.

Nevertheless, this embodiment of the tool has useful employment in those situations where less misalignment of the pipes to be connected is present. In fact, this embodiment can be used when there is no misalignment at all.

While coupling members 171 and 176 have been described as being attached respectively to pipes 172 and 177 by weld means, it is to be understood that they could also be attached to pipes 172 and 177 be means of overfitting sections and gripping and seal means as described with the prior embodiments, as for example, the FIG. 1 embodiment.

The foregoing embodiment, as well as those which follow, may for convenience sometimes be referred to as a "boltless flange" in that no bolts are required to complete the coupling. They may be easily coupled and uncoupled remotely by application of hydraulic pressure as described above and permit quick connection and disconnection of the pipes. While the coupling of this embodiment may be flexible, it may also be made inflexible by application of sufficient pressure on pistons 186 so as to make the coupling rigid. Moreover, the annular teeth 178 on the forward side of enlarged portion 173 are also arranged for embedding in the mating surface of housing portion 175 to reduce the tendency for flexing and also providing an additional means for sealing between coupling member 171 and coupling member 176.

Figure 12:
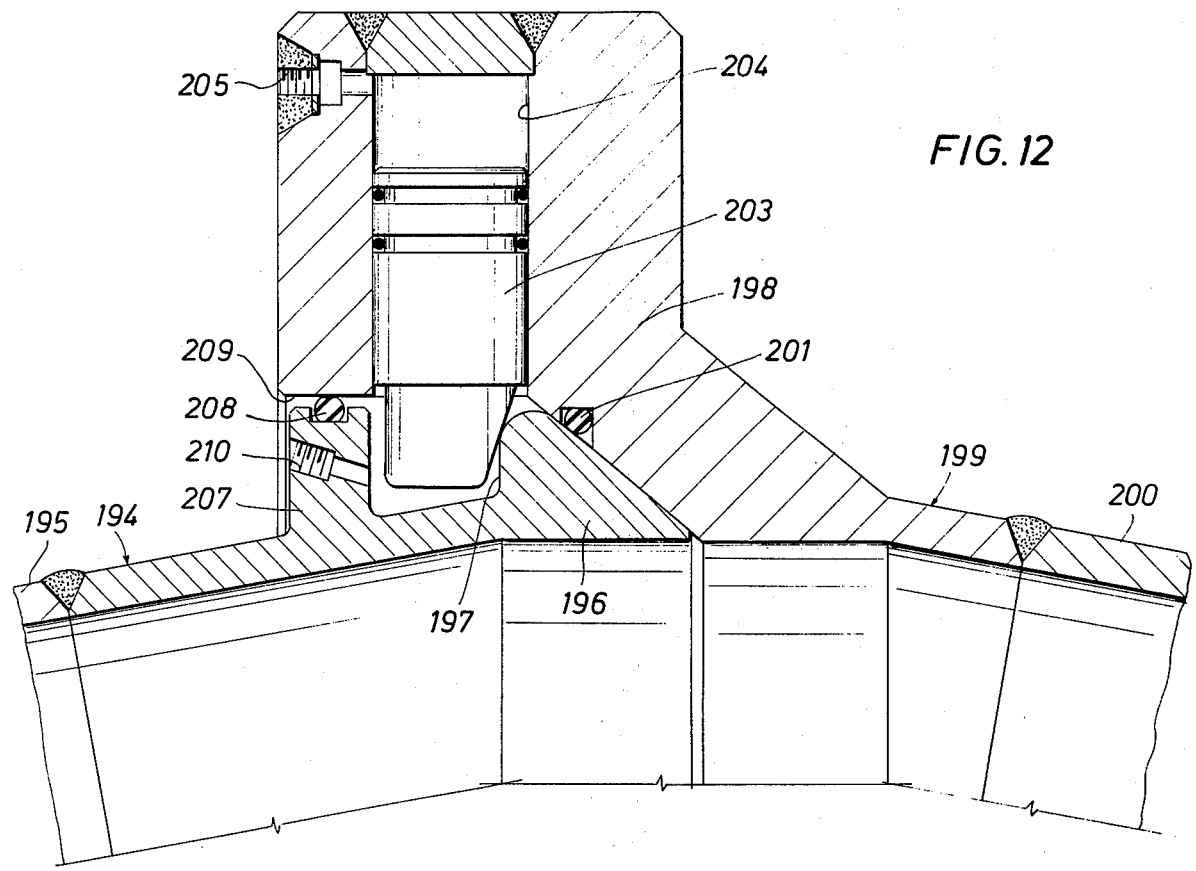
FIG. 12 is a partial central vertical sectional view of still another alternative embodiment of the invention wherein the housing and enlarged portion are respectively attached at an angle with respect to the central axes of the couplings for accommodating misalignment by relative rotation between the two couplings.

Referring now to FIG. 12, a further alternative embodiment will be described. Here a first coupling member 194 is shown attached, as by welding, to pipe 195 at one end thereof and has a tilted radially outwardly enlarged portion 196 attached to the other end thereof. Enlarged portion 196 is attached to coupling 194 such that the central axis of portion 196 is at a minor angle of 10° with the central axis of coupling 194. Further, the forward or right side of enlarged portion 196, as viewed in FIG. 12, is generally frustoconical in shape and hence may be described as being tapered radially inwardly in the axial direction away from the rearward side 197 of enlarged portion 196. The forward side of enlarged portion 196 is arranged for mating engagement with the frustoconical shaped surface of housing portion 198, which is also attached at a tilted angle to second coupling member 199. The tilt of this connection is such that the central axis of housing portion 198 is at a minor angle of 10° with the central axis of coupling member 199. The right end of coupling member 199, as shown in FIG. 12, is connected to pipe 200, as by welding means or the like. Further, the mating face of housing portion 198 is provided with an annular recess in which is mounted an annular seal 201 for sealing with the forward side of enlarged portion 196, as shown.

Rearward side 197 of enlarged portion 196 is tapered radially inwardly in the manner similar to enlarged portion 173 of FIG. 10 and is arranged for camming engagement by the radially inward ends of a plurality of circumferentially spaced generally radially movable pistons 203, each of which is mounted in a radially extending cylinder bore 204 provided in housing portion 198. Cylinder bores 204 are circumferentially spaced about housing 198, as with the previous embodiment, so that the rearward side 197 of enlarged portion 196 is arranged for engagement at a plurality of circumferentially spaced apart points, to thereby urge and lock enlarged portion 196 in housing portion 198, as shown in FIG. 12.

Means are provided for applying hydraulic fluid pressure to actuate pistons 203 and this takes the form of a plurality of valved inlets 205, each of which communicates with the radially outward end of a cylinder bore 204.

In operation, pistons 203 are held in a radially outward retracted position and enlarged portion 196 is inserted in housing portion 198. Thereafter, by application of hydraulic fluid presssure through inlets 205, pistons 203 are urged radially inwardly to engage the rearward side 197 of enlarged portion 196, with the result that enlarged portion 196 is cammed into sealing engagement with housing portion 198, as shown in FIG. 12.

Coupling member 194 is also provided with a tilted external ring 207 supporting an annular seal 208 thereabout, which seals with annular opening 209 in the end of housing portion 198. It is through opening 209 that enlarged portion 196 is passed in the coupling and uncoupling operation.

In case it becomes necessary or desirable to effect uncoupling of the apparatus, then pressure may be relieved on valved inlets 205 and hydraulic pressure applied through release inlet 210 provided in tilted ring 207, which causes pistons 203 to be moved radially outwardly to the disengaged position, at which point the coupling may be disconnected. In the FIG. 12 embodiment, the coupling shown therein can accommodate a misalignment up to 20° between pipes 195 and 200. This misalignment can be accommodated by rotating coupling 194 relative to coupling member 199 until the desired degree of misalignment is accommodated. If desired, the forward side of enlarged portion 196 could be in the form of the radius of a circle in cross-section as with the FIG. 10 embodiment, in which event the coupling could accommodate 4 additional degrees of misalignment.

Further, it is to be understood that if no misalignment capabilities were required, then tilted enlarged portion 196 could be mounted coaxially with respect to coupling member 194 and housing portion 198 would similarly be mounted coaxially with coupling member 199. In this event, the resulting coupling would have no misalignment capabilities and would provide a rigid connection with no flexibility, by virtue of the frustoconical shape of the forward side of enlarged portion 196. Such tool may have some use use in certain environments where a quick connect and disconnect coupling is desired, but in which no misalignment capability is required.

Figure 13:
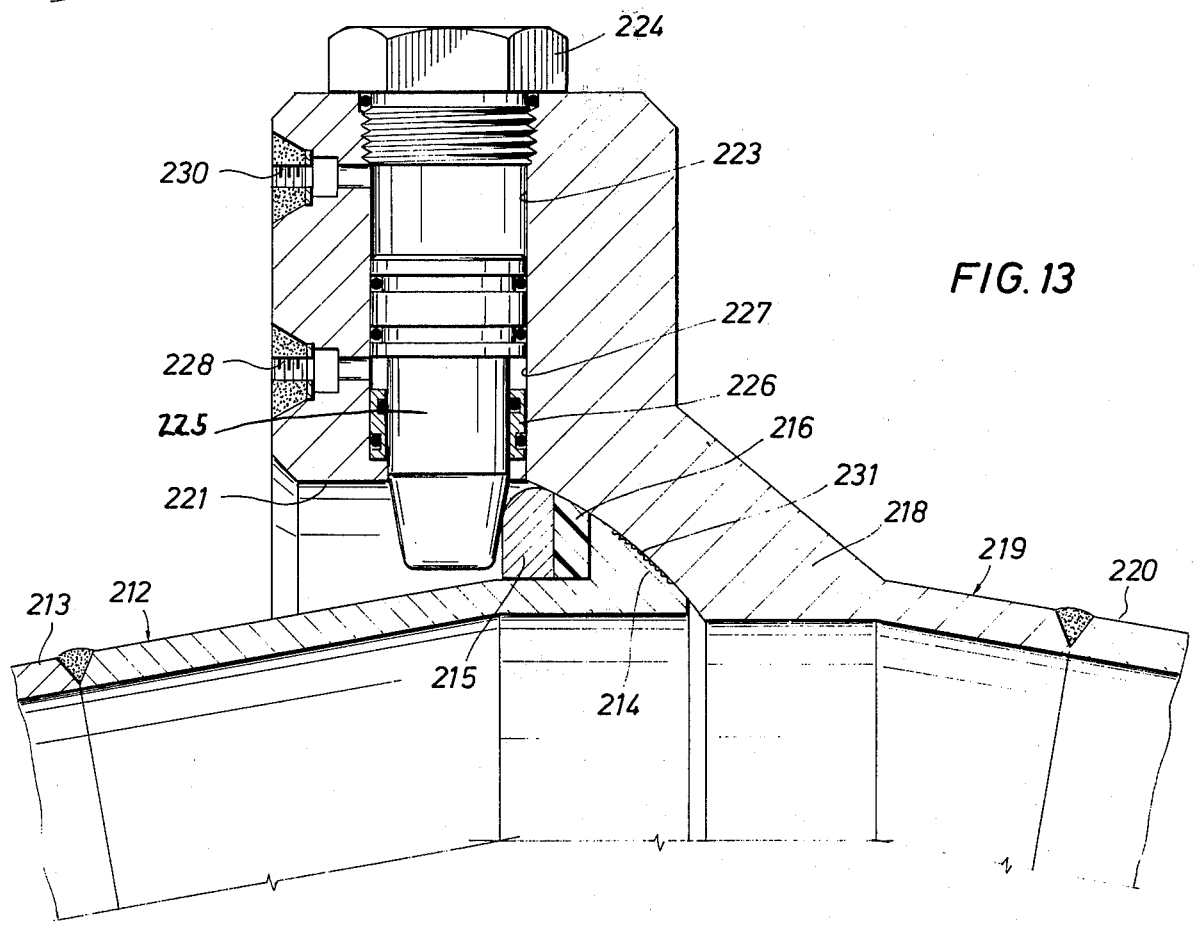
FIG. 13 is a partial central vertical sectional view of still a further embodiment of the invention showing alternative sealing means as well as the slanted connection of the ball portion and housing to the respective couplings, as with the FIG. 12 embodiment.

Referring now to FIG. 13, a still further embodiment will be described. Here, a coupling member 212 is shown attached as by welding to pipe 213 and at the other end thereof coupling member 212 has provided an annularly radially outwardly enlarged portion 214 which portion is also tilted at an angle of 10° with respect to coupling member 212 as with the previous embodiment. For purposes of this application, the term "enlarged portion" shall also include an annular tilted thrust ring 215 which is spaced from enlarged portion 214 by a resilient seal ring 216. Seal ring 216 is arranged for radially outward deformation into sealing engagement with the mating surface of socket or housing portion 218, as shown. It is to be understood that housing portion 218 is connected in a tilted fashion to the coupling member 219 at an angle of 10° as with the previous embodiment. The right end of coupling member 219, as viewed in FIG. 13, is attached as by welding to pipe 220. Coupling member 212 is arranged for insertion into housing portion 218 through annular opening 221 provided in the left end of housing portion 218.

As with the previous embodiment, housing portion 218 is provided with a plurality of radially extending circumferentially spaced about cylinder bores 223, the radially outward ends of which are closed by removable cylinder plugs 224. Valved inlets 230 are provided for supplying pressurized fluid such as hydraulic fluid to the radially outward ends of bores 223. Bores 223 each have mounted therein a generally radially movable piston 225, the radially inward ends of which are tapered and arranged for camming engagement with the thrust ring 215. Upon the application of fluid pressure to urge pistons 225 radially inwardly, they engage the rearward side of thrust ring 215 and urge ring 215 axially to the right as shown in FIG. 13 with the result that seal ring 216 is compressed and axially deformed into sealing engagement.

The radially inward ends of each of the cylinder bores 223 has mounted therein a sealing sleeve 226 through which the piston 225 extends. It will also be noted that the radially outward end of pistons 225 are enlarged relative to the radially inward end thereof so as to provide annular chambers 227 which are communicated with by inlet means in the form of valved inlets 228. Hence, upon release of pressure through inlets 230 and application of pressure through inlets 228, pistons 225 can be retracted to the disconnect position.

With the FIG. 13 embodiment, the forward side of enlarged portion 214 is provided with annular teeth 231 for engagement with the mating surface of housing portion 218 as shown, to provide sealing and frictional engagement therewith. Further, the forward face of enlarged portion 214 generally describes the radius of a circle in cross-section, or stated otherwise, describes a section of a sphere with the result that the coupling can accommodate 4° of misalignment at the interface between enlarged portion 214 and housing portion 218. In addition, by virtue of the fact that enlarged portion 214 is tilted at an angle of 10° with respect to the axis of coupling member 212 and, similarly, housing portion 218 is tilted at an angle of 10° with respect to coupling member 219, an additional 20° of misalignment can be accommodated by rotating coupling member 212 relative to coupling member 219 so as to obtain the desired degree of misalignment for joining pipes 213 and 220.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed and certain features of the invention may be utilized independently of the use of other features, all as would be apparent to one skilled in the art after having the benefit of this description of the invention.

What is claimed is:

1. In apparatus for connecting the ends of two pipes or the like, the combination comprising:

a pair of coupling members, each of which is adapted for connection at one end thereof to the end of one of said pipes;

with one of said coupling members having attached to the other end thereof an annular radially outwardly enlarged portion having axially forward and rearward sides;

a housing attached to the other end of said other coupling member, said housing being arranged to receive the forward side of said enlarged portion in generally mating engagement therewith;

a plurality of cam members supported by said housing initially in a radially retracted position, whereby said enlarged portion can be freely mated with said housing, and said cam members being arranged for generally radially inward movement into positive camming and locking engagement with the rearward side of said enlarged portion;

means for urging said cam members radially inward, including means for applying pressurized fluid to said housing to produce a force to actuate said cam members radially inward into engagement with the rearward side of said enlarged portion, with said force being sufficient in amount to cause said cam members to urge said enlarged portion into continual positive contact with said housing, whereby said enlarged portion and said housing are held against relative longitudinal movement therebetween;

an annular seal interposed between one side of said enlarged portion and said housing for providing a fluid seal therebetween;

and conduit means provided in said housing for applying pressurized fluid to said seal to urge said seal into sealing engagement between said enlarged portion and said housing;

another annular seal interposed between the other side of said enlarged portion and said housing, said other seal being generally axially spaced from said first seal and forming an annular testing chamber therebetween;

and another conduit means provided in said housing and communicating with said annular chamber between said enlarged portion and said housing and between said seals for testing said seals.

2. Apparatus for rigidly connecting the ends of two pipes comprising;

a pair of coupling members, each of which is connectible at one end thereof to the end of one of said pipes;

one of said coupling members having attached to the other end thereof an annular radially outwardly enlarged portion having axially forward and rearward sides, said forward side at least being spherically-shaped;

the other coupling member having attached to the other end thereof a housing having a spherically-shaped internal surface portion in which the spherically-shaped forward side of said enlarged portion is freely received in generally mating engagement therewith thereby enabling the central axes of the respective coupling members to be inclined at an angle relative to each other for connecting similarly inclined pipe ends;

annular seal means interposed between said enlarged portion and said housing for providing a fluid seal therebetween;

a plurality of cam members supported in circumferentially disposed relation about said housing and movable between a generally radially retracted position to permit the spherically-shaped internal surface portion of said housing to freely receive the spherically-shaped forward side of said enlarged portion in generally mating engagement therewith as aforesaid and a generally radially extended and locked position engaging said rearward side at a plurality of points circumferentially thereabout to urge said enlarged portion into continual positive contact with said housing, each said cam member and the spherically-shaped internal surface portion of said housing being mutually dependent on each other to prevent relative axial and flexing movement between said coupling members, thereby providing a rigid connection, and means for moving said cam members towards said extended and locked position.

3. Apparatus as defined in claim 2 wherein:

said seal means includes a pair of axially spaced annular seal members defining an annular testing chamber therebetween, and conduit means provided in said housing and communicating with said annular testing chamber for pressure testing said seal members.

4. Apparatus as defined in claim 3 and further including:

another conduit means provided in said housing and communicating with at least one of said annular seal members for applying pressure thereto to urge said one seal member into engagement with said enlarged portion.

* * * * *